(12) United States Patent
Kuhlmann (10) Patent No.: US 8,720,359 B2
(45) Date of Patent: May 13, 2014

(54) RUDDER FIN

(75) Inventor: Henning Kuhlmann, Hamburg (DE)

(73) Assignee: Becker Marine Systems GmbH & Co. KG, Hamburg (DE)

( * ) Notice: Subject to any disclaimer, the term of this patent is extended or adjusted under 35 U.S.C. 154(b) by 0 days.

(21) Appl. No.: 12/764,397

(22) Filed: Apr. 21, 2010

(65) Prior Publication Data

US 2010/0269745 A1 Oct. 28, 2010

(30) Foreign Application Priority Data

Apr. 22, 2009 (DE) .......................... 10 2009 018 176
Jul. 13, 2009 (DE) .......................... 10 2009 033 163

(51) Int. Cl.
*B63H 25/06* (2006.01)

(52) U.S. Cl.
USPC ........................................................ 114/162

(58) Field of Classification Search
USPC ............. 114/144 R, 149, 152, 162, 164–172, 114/271, 273, 278, 281
See application file for complete search history.

(56) References Cited

U.S. PATENT DOCUMENTS

| 4,383,955 A | | 5/1983 | Rubio et al. |
| 4,448,146 A | | 5/1984 | Becker |
| 4,463,699 A | * | 8/1984 | Lineback .................... 114/39.25 |
| 4,562,784 A | * | 1/1986 | Lineback .................... 114/39.25 |
| 5,113,775 A | * | 5/1992 | Imhoff ........................ 114/39.24 |
| 5,496,002 A | | 3/1996 | Schutze |
| 5,806,798 A | | 9/1998 | Gillandt et al. |
| 5,904,111 A | * | 5/1999 | Frigard ....................... 114/39.28 |
| 6,227,131 B1 | * | 5/2001 | Strong et al. .................... 114/162 |
| 6,945,186 B2 | | 9/2005 | Lehmann |
| 7,509,918 B2 | * | 3/2009 | Lehmann ...................... 114/169 |
| 7,591,230 B2 | * | 9/2009 | Kluge et al. .................. 114/162 |
| 2008/0110386 A1 | | 5/2008 | Kluge et al. |

FOREIGN PATENT DOCUMENTS

| DE | 84 23 818.6 U1 | 11/1984 |
| DE | 34 08 532 A1 | 9/1985 |
| DE | 43 29 744 C1 | 9/1993 |
| DE | 195 09 340 A1 | 3/1995 |
| DE | 195 28 664 A1 | 2/1997 |
| DE | 201 18 779 U1 | 11/2001 |
| DE | 10 2005 018 428 A1 | 10/2006 |
| EP | 0 051 822 A1 | 5/1982 |
| EP | 0 579 533 A1 | 1/1994 |
| EP | 0 580 463 A2 | 1/1994 |
| FR | 2 692 546 A1 | 12/1993 |
| JP | 56-108392 A | 8/1981 |
| JP | 4-8698 A | 1/1992 |
| JP | 8-276441 A | 10/1996 |
| JP | 10-1086 A | 1/1998 |
| JP | 10-53196 A | 2/1998 |
| JP | 2008-120370 A | 5/2008 |
| TW | 226353 | 7/1994 |

* cited by examiner

*Primary Examiner* — Daniel V Venne
(74) *Attorney, Agent, or Firm* — Kelly & Kelley, LLP (57) ABSTRACT

In order to achieve improved properties for a fin for a rudder for water vehicles, the fin is at least partially made of a fiber-composite material. The body for the fin has one or more separated inner hollow areas which are filled with a filler material. The fin body has a front leading edge facing a rudder, a rear trailing edge facing away from the rudder, and stiffening elements arranged between both edges.

19 Claims, 5 Drawing Sheets

RUDDER FIN

The invention relates to a fin for a rudder for water vehicles, in particular ships, which have high demands with respect to their maneuverability. "High demands with respect to their maneuverability" refers below to ships, for which particularly high rudder forces are required and/or ships that must perform maneuvers at slow speeds such as docking maneuvers, without additional assistance, e.g. from tugboats.

Rudders with these types of fins are also called "fin rudders" or "flap rudders". These concern mostly so-called "full spade rudders", on the trailing edge of which, i.e. on the rear rudder rail as seen from the direction of ship travel, a moveable and/or pivotable fin is fastened by means of suitable fastening means, e.g. hinges or the like. As a general rule, however, these types of moveable fins can also be used in other rudder types, for example in semi-spade rudders or in rudders mounted in the sole piece.

The fin is normally designed articulated on the rudder blade of the rudder, wherein the articulation of the fin can be specified by means of an articulation device arranged between the ship hull and fin. These types of rudders are frequently designed forcibly controlled such that the fin is also articulated during the rolling of the wheel, i.e. during the pivoting of the rudder around the rudder stock axis. A greater propeller stream deflection and higher rudder forces can be achieved hereby with fin rudders so that improved maneuverability results compared to conventional rudders. The fin should thus be connected in a pivotable manner with the rudder blade of the main rudder, normally by means of hinges or the like, and is normally pivotable in the installed state around a vertical axis and/or around an axis parallel to the trailing edge of the rudder blade.

The fins are normally designed such that they have a height similar to that of the rudder blade and a length as seen in the ship's direction of travel of approx. $1/3$ to $1/10$ of the rudder blade length. Thus, fins for large ships like container ships or tankers, in which the rudder blade surface is frequently 80 m$^2$ and more, can reach an appropriately large size. Since rudder fins in general as well as rudder blades are made of metal in particular of steel, the rudder fins for large ships have a correspondingly high weight.

Figure 1:
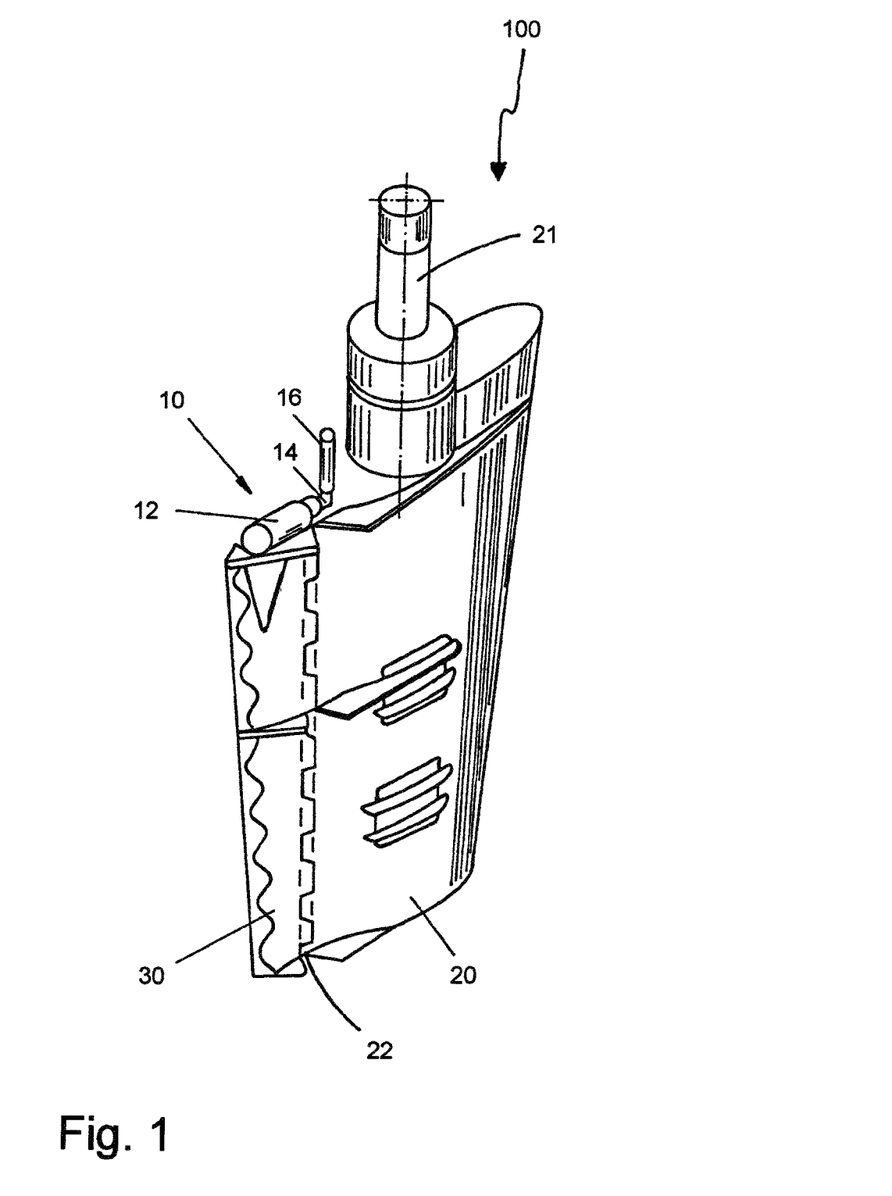
FIG. 1 a perspective view of a spade rudder with a fin known from the state of the art.

FIG. 1 shows an example of a perspective view of a full spade rudder 100 with a pivotable fin 30 known from the state of the art. The rudder shown in FIG. 1 comprises a rudder blade 20, which can be pivoted around a rudder stock 21, which should be connected with a steering gear (not shown here) arranged in a ship's hull. A pivotable and positively driven fin 30 mainly made of metal, which is provided with an articulation device 10 designed as a sliding pivoting piston linkage, is provided on the rear trailing edge of the rudder blade 20 as seen from the direction of travel. The articulation device 10 is arranged on the upper end area of the fin 30 as well as on the lower end of the skeg as a permanent component of the ship structure (not shown) and comprises a universal joint with a hinge pin 14 and the bearing housings 12 and 16 of associated horizontal pistons and vertical pistons (not shown here). It is recognizable that the articulation device 10 is arranged outside of the rudder fin and/or the rudder blade 20 of the rudder fin 30. The fin 30 progresses over the entire height of the rudder blade 20 and is arranged in a pivotable manner around the trailing edge 22 of the rudder blade 20.

It is generally advantageous to design the rudder and/or rudder fins in the lightest possible manner in order to have to apply less force during the rolling of the wheel, to be able to dimension the bearing of the rudder in a correspondingly smaller manner, etc. On the other hand, however, extremely high rudder forces occur in the case of rudder fins which are due to the fact that the rudder fin has a larger angle to the propeller flow than the rudder blade. Extremely high forces occur in particular in the connection area between the rudder fin and the rudder blade so that the material, from which the rudder fin is made, must be designed in an appropriately rigid and stable manner.

The object of the present invention is to specify a fin for a rudder for water vehicles, which has improved properties, in particular a reduced weight and simultaneously sufficient stability with respect to the rudder forces acting on the rudder fin, compared to the rudder fins known from the state of the art.

The object based on the invention is solved through a rudder fin with the characteristics of claim 1.

In the case of the present invention, the rudder fin has a fiber-composite material. It is hereby advantageous that through the production and/or manufacturing of the rudder fin, at least partially, using fiber-composite material, the weight of the rudder fin is considerably reduced and can simultaneously reach a sufficient stability and/or bending and connection rigidity of the rudder fin. In particular a carbon fiber composite material is advantageously used. Fiber-composite plastics and other fiber-composite materials can also be used. In particular graphite fibers can be used as carbon fibers. The advantage of the use of fiber-composite materials is their low weight and their high rigidity and stability. The use of fiber-composite material for the production of the rudder fin, on which extremely high rudder forces act, was attempted for the first time with the present invention.

It is generally advantageous to make the fin as large as possible, i.e. for the most part and/or mainly, of fiber-composite material. It is also possible that the fin be entirely made of fiber-composite material. The larger the share of fiber-composite material in the rudder fin, the stronger the advantageous achieved hereby, e.g.:

The bearing of the rudder can be dimensioned smaller.
The assembly and/or the maintenance of the rudder fin is simplified.
The production of the fin and the adjustment to the rudder blade is simplified.

In a preferred embodiment of the invention, the fin has a fin body, which is at least partially made of fiber-composite material. The fin body is thereby designed such that it forms the matrix and/or the skeleton of the fin. In particular, the fin body should advantageously be designed to receive the forces fed to the rudder fin during operation. The fin body is preferably made to the greatest extent possible out of a fiber-composite material so that the fin body is particularly preferably made mainly of a fiber-composite material. It is also possible that the fin body be made entirely of a fiber-composite material. The higher the share of fiber-composite material on the fin body, the greater the achieved weight reduction, since the fin body of rudder fins is normally, conventionally made of metal. The fin body is usually designed such that it can receive the forces acting on the rudder fin. Accordingly, it must have sufficient stability and/or rigidity, which is provided when it is made of a fiber-composite material.

Furthermore, it is preferred that the fin body mainly, preferably completely, forms the outer surface of the rudder fin. Thus, in the case of this embodiment, the fin body includes the lateral surfaces of the rudder fin, the front leading edge, the rear trailing edge and the upper and lower end areas of the rudder fin. If applicable, additional, suitable material layers such as protective paint or the like can be applied to the surface of the rudder fin made of fiber-composite material. In this embodiment, the fin body thus forms a mainly closed main body, which forms the rudder fin.

In particular in the case of the exemplary embodiment described above, it is advantageous that the fin body forms one or more inner hollow areas separated from each other. These hollow areas can advantageously be filled in with a suitable filler material, in particular a foam-like material like high-strength and water-tight foams. The rudder fin does not thereby need to be designed as a massive body, which continues to be advantageous for the weight reduction of the rudder fin. At the same time, the fin body is designed such that sufficient stability and/or rigidity of the rudder fin is created. The filling of the hollow area(s) with a filler material serves as a further support of the fin body. In the case of this exemplary embodiment, the rudder fin could for example be made of a fin body made of fiber-reinforced plastic and a foam core made of PU foam or the like and would thus make due entirely without components and/or parts made of metal.

It is furthermore preferred that the fin body comprises a front leading edge facing a rudder as well as a rear trailing edge facing away from a rudder, wherein stiffening elements, in particular intermediate floors, are arranged between the two edges. Also in the case of this embodiment, in particular the outer surface of the rudder fin can mainly be formed from the fin body. The stiffening elements serve to reinforce and/or increase the load-bearing capacity of the rudder fin and can generally be designed in any suitable form. It is particularly preferred to design these stiffening elements as intermediate floors, which are also preferably made of fiber-composite material. These intermediate floors divide the inner hollow area of the fin body into individual bottom hollow areas and/or subsections, which can each be provided with a foam core. However, another design of the stiffening elements is also generally conceivable, for example as braces or the like.

In another preferred embodiment, the fin has one or more receiving/joint elements, which are designed for connection with a rudder and/or for the receiving of parts of a rudder. Since the rudder fin is generally arranged in an articulatable manner on the rudder blade of the main rudder, a pivotable connection must be provided between the rudder blade and the rudder fin and an articulation device or the like. The receiving/joint elements are provided for the fin-side reception of these components and/or the establishment of the connection. Thus, a receiving/joint element e.g. for receiving a component of the articulation device normally arranged on the upper rudder blade area, e.g. a sliding pivoting piston, can be designed. Alternatively or additionally, the receiving/joint elements can be part of a hinge connection or the like between the rudder fin and the rudder blade, wherein the receiving/joint element in this case can be designed as a hinge receiving and as a hinge itself.

In order to enable a connection with the rudder, or in order to be able to receive the rudder components, it is advantageous to arrange the receiving/joint elements in the area of the front leading edge of the rudder fin and/or in the upper end area of the fin. Furthermore, the receiving/joint elements are preferably designed within the fin body of the rudder fin and/or integrated into the fin body. For one, this advantageously facilitates the production process of the rudder fin, and also ensures that the receiving/joint elements are located in the area of the greatest stability of the rudder fin, namely in the fin body, since the largest forces typically occur in the connection area between the rudder fin and the rudder blade.

The receiving/joint elements can generally be made of any suitable material, in particular also a fiber-composite material or a combination of several different materials. However, it is preferred to design the receiving/joint elements out of a metallic material, in particular steel. Since high forces occur in the area of the receiving/joint elements, as already mentioned, and/or steel is particularly suitable as a bearing material, the elements are advantageously made of metal and/or steel. However, any other suitable, sufficiently strong and stable material can also generally be used. If the receiving/joint elements are made of steel with an integrative arrangement in the fin body, the fin body will continue to be seen as mainly made of fiber-composite material when the rest of the fin body is made of fiber-composite material within the framework of the present invention.

The design of the receiving/joint elements made of steel material advantageously offers the possibility of processing them in a finished size on relatively small machine tools before the production of the fin body. The receiving/joint elements can be aligned using a suitable device, in order to then produce the fin body around the arrangement. The otherwise conventional and comparatively complicated mechanical processing of the receiving/joint elements after production of a fin body in a conventional steel construction is thus omitted.

The receiving/joint elements can generally have any suitable form. In another preferred embodiment, the receiving/joint elements are designed as tubes and/or as a combination of several tubes. The fibers of the fiber-composite material can preferably be wound around these tubes in order to produce the rudder fin. The tubes can thereby be used as a wound core, around which the fibers are wound for the production of the fin body and which remains in the component, i.e. in the fin body, after completion of the winding. Such receiving/joint elements designed as tubes are suitable in particular for receiving sliding pivoting pistons from articulation devices and/or for receiving hinge pins from hinges of rudder blades. Furthermore, the stability and/or rigidity of the fin body can increase in the case of an integrative arrangement.

Since the greatest forces act on the rudder fin in particular in the connection area between the rudder fin and the rudder blade in general and the rudder fin is normally connected in a pivotable manner with the rudder blade in the area of its front leading edge, it is advantageous to design the fin body in a reinforced manner in the area of the front leading edge. This can be achieved for example through the provision of reinforcement layers of fiber-composite material or an overall thicker design of the fin body in the front edge area compared to the other area of the fin body.

In another preferred embodiment, the fin body has a maximum length of 15 to 50%, preferably 20 to 40%, of the maximum length of the fin in a cross-sectional view in the area of the front leading edge. It was determined that in the case of such length ratios optimal results can be achieved with respect to sufficient stability and/or rigidity of the rudder fin with simultaneously maximum weight reduction. The maximum length of the fin body is thereby advantageously provided in the area of the pivot connections of the rudder fin with the rudder blade, in particular in the area of the uppermost pivot connection.

Production in a fiber-composite construction generally enables a simpler implementation of complex geometries and/or bent, profiled surfaces than is possible with steel constructions. A hydrodynamically more beneficial profile with less flow resistance can be simultaneously realized especially in the upper end area, on which the articulation is located, through a geometrically optimally modified design.

Furthermore, the object on which the invention is based is solved through a method for the production of a fin of a rudder for water vehicles, in particular for ships with high demands with respect to their maneuverability, in which a fin body is produced, which mainly consists of a fiber-composite material, mainly forms the outer surface of the fin and has at least one hollow space. By making the fin body out of a fiber-composite material, considerable weight reduction can be achieved with simultaneous guarantee of sufficient rigidity of the rudder fin. The provision of a hollow area instead of the design of a massive body further contributes to the weight reduction of the rudder fin. One or more receiving/joint elements can preferably be provided on the fin body, which are designed for the connection with a rudder and/or for receiving parts of a rudder. Furthermore, the at least one hollow area can be filled with a filler material.

For the production of the fin body, which is at least mostly made of a fiber-composite material, any suitable production process known from the state of the art can generally be used for fiber-composite materials. In a preferred embodiment of the method according to the invention, two half shells, which are combined together into the fin body, are produced for the production of the fin body. Furthermore, stiffening elements, in particular intermediate floors, can advantageously be used, which are positioned between the two half shells before the joining and are arranged within the two half shells and thus in the hollow area of the fin body after the joining. In an alternative embodiment, foam cores are provided, around which the fin body made of fiber-composite material is wound. A winding around the receiving/joint elements can also advantageously take place. Alternatively or additionally, layers and/or mats of fiber-composite material, can be laminated, in particular manually, onto the cores and/or the receiving/joint elements. In contrast to this, the fiber winding is generally performed mechanically. With this method, qualitatively high-quality and in particular extremely economical fins and/or fin bodies in particular in the case of small numbers can be produced since this method requires no initial investment for half shell molds.

A preferred embodiment of the invention is shown in the drawing. The drawings schematically show in:

FIG. 4b1 a sectional view of the rudder fin from FIG. 3a;

FIG. 4b2 an enlargement of a section from FIG. 4b1;

FIG. 4c another sectional view of the rudder fin from FIG. 3a;

FIG. 4d another sectional view of the rudder fin from FIG. 3a;

FIG. 4e another sectional view of the rudder fin from FIG. 3a;

FIG. 4f another sectional view of the rudder fin from FIG. 3a;

FIG. 4g another sectional view of the rudder fin from FIG. 3a;

Figure 2:
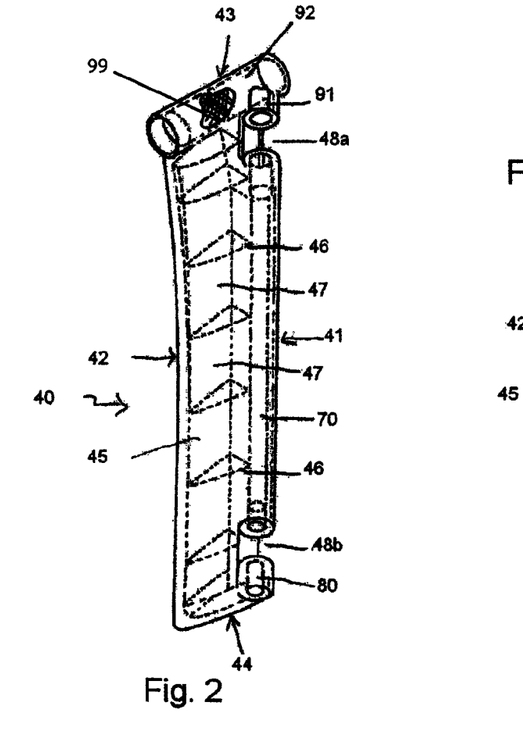
FIG. 2 a perspective side view of a rudder fin according to the invention.

FIG. 2 shows a fin 40 according to the invention, which is designed for pivotable articulation on a rudder blade of a rudder for water vehicles. Covered or internal parts of the fin 40 are shown using dashed lines in the representation of FIG. 2. Thus, the fin 40 comprises a front leading edge 41, a rear trailing edge 42, an upper end area 43 and a lower end area 44. The fin 40 is formed by a fin body made of a fiber-composite material, which comprises all fin material in the area of the front leading edge 41, the trailing edge 42, of the upper end area 43 and of the lower end area 44. Moreover, the fin body comprises side walls and/or side surfaces 45 and several intermediate floors 46 arranged between the two edges 41, 42 and the side walls 45. The intermediate floors 46 divide the hollow area arranged between the edges 41, 42 of the two end areas 43, 44 and the side walls 45 of the fin body into several, separate hollow areas 47. These hollow areas are preferably filled with a foam core (not shown here). An upper recess 48a and a lower recess 48b are provided in the area of the front leading edge 41 of the fin 40. Furthermore, a steel tube 70 is provided between both recesses 48a, 48b and parallel to the longitudinal axis of the fin 40 in the fin body in the area of the front leading edge 41. Another steel tube 80 parallel to the longitudinal axis is provided in the fin body between the lower recess 48b and the lower end area 44. Another relatively short steel tube 91, which is connected with another longer steel tube 92 mainly arranged orthogonally to it, is provided above the upper recess 48a. The steel tube 92 runs transverse to the longitudinal direction of the fin 40 through the upper end area 43. Together with the recesses 48a, 48b, the steel tubes 91, 70 and 80 form two receiving/joint elements for pivotable connection with a rudder blade. The receiving/joint elements of the frontal edge area of the fin 40 shown here and consisting of tubes 70, 80, 91 and recesses 48a, 48b are designed in particular for receiving hinge pins of hinges of a rudder blade. The hinge pins (not shown here) can each be inserted into the end areas of the tubes 70, 80, 91 which are open towards the recesses 48a, 48b, while the hinge component (not shown here) of the rudder blade arranged around the hinge pins can be inserted into the respective recess 48a, 48b. All tubes 70, 80, 91, 92 are fully arranged within the fin body of the rudder fin 40 and/or are designed integrated into it. The tube 92 is another receiving/joint element and is designed for receiving a part of an articulation device, in particular of a sliding pivoting piston, of a rudder blade (not shown here). The piston can be inserted through the tube 92 and thus serves to forcibly articulate the fin 40 on a rudder blade of a rudder for water vehicles. In contrast to the fins known from the state of the art and for example shown in FIG. 1, the receiving/joint element 92 of the rudder fin 40 according to the invention is designed in the fin body of the fin 40 and/or is integrated into it and is not fitted on the upper end area 43 of a fin 40 like usual. The structure of the rudder fin is hereby simplified and no separate components need to be installed on the fin 40.

FIG. 2 further shows a cutaway indicating the fiber-composite material 99 wound and/or laminated around the tube 92. The fiber-composite material 99 is preferably similarly wound around the other tubes 70, 80 and 91.

Figure 3A:
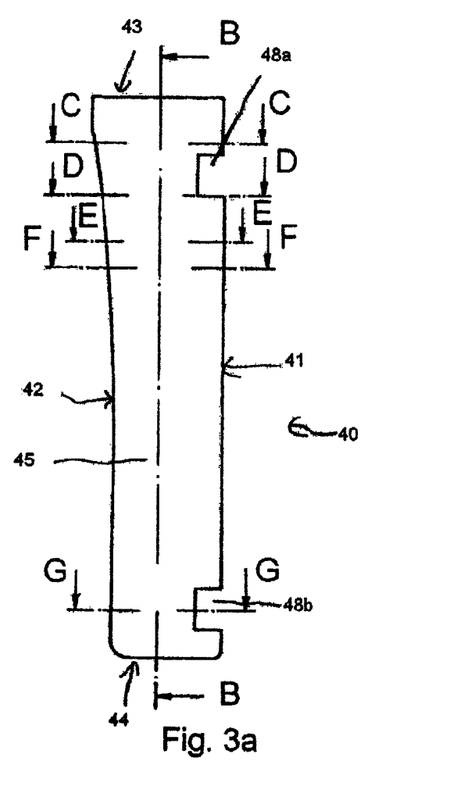
FIG. 3a a side view of the rudder fin from FIG. 2.
Figure 3B:
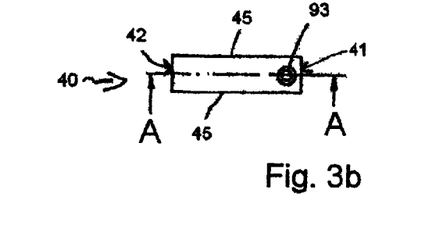
FIG. 3b a top view of the rudder fin from FIG. 2.
Figure 4A:
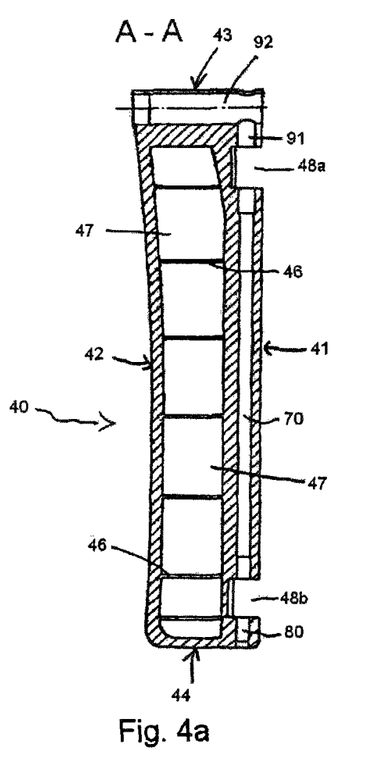
FIG. 4a a sectional view of the rudder fin from FIG. 3b.

FIG. 3a shows a side view of the rudder fin 40 from FIG. 2. In contrast, FIG. 3b shows a top view of the same fin 40. FIG. 4a through 4g show different sectional representations of the fin from FIGS. 2, 3a and 3b. Thus, FIG. 4a shows a longitudinal sectional view through the fin 40. All hatched, cut surfaces in FIG. 4a represent the fin body of the fin 40, made of fiber-composite material, into which the tubes 70, 80, 91, 92 of the receiving/joint elements are integrated. The intermediate floors 46 are arranged parallel to each other and divide the inner area of the fin body of the fin 40 into several separate hollow areas 47, which are preferably filled with a foam core. Furthermore, it is recognizable that the entire fin is made of the fin body made of fiber-composite material, the tubes 70, 80, 91, 92 integrated into the fin body and if applicable the foam cores (not shown here) arranged in the hollow areas 47.

Furthermore, it is recognizable that the frontal edge 41 in the area of the upper recess 48*a* is designed reinforced, i.e. thicker than shown in the other area, since high loads occur here. The outside of the frontal edge 41 is designed mainly linear, just like the outsides of the upper and lower end area 43, 44. In contrast, the outside of the trailing edge 42 has a flat, curved and/or convex progression, wherein the greatest width of the fin 40 is designed in the upper end area 43. The tubes 70, 80, 91 and 92 serve for one to receive components of a rudder. On the other hand, however, they also reinforce the respective areas of the fin body, in which they are arranged, namely the frontal edge area 41 and the upper end area 43.

Figure 4B:
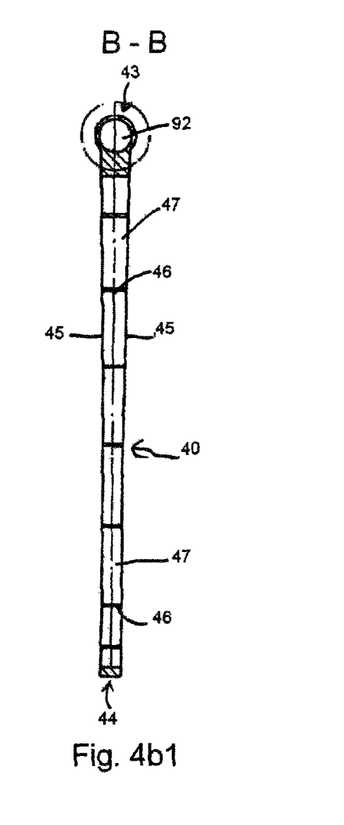
Figure 4B:
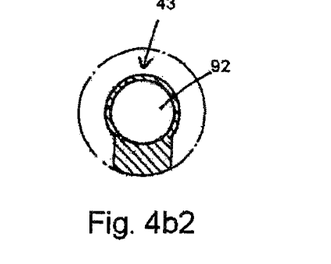

FIG. 4*b*1 shows a longitudinal sectional view through the rudder fin 40 turned by 90° with respect to the longitudinal sectional view from FIG. 4*a*. FIG. 4*b*2 is an enlargement of the upper end area 43 of FIG. 4*b*1. It is recognizable that the tube 92 is completely surrounded and/or encased by the fiber-composite material of the fin body in the upper end area 43 of the rudder fin 40. Thus, the entire outer surface of the rudder fin 40 is formed by the fin body made of fiber-composite material.

Figure 4C:
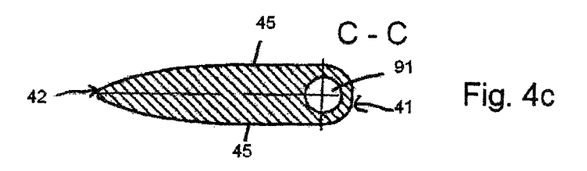

In contrast, FIG. 4*c* through 4*g* show different cross-sectional representations of the rudder fin from FIGS. 2, 3*a* and 3*b* respectively. FIG. 4*c* shows a cross-sectional view through the rudder fin 40 in the area between the tube 92 and the uppermost hollow area 47. Thus, the cross-section proceeds along the intersecting line C-C holohedrally through the fin body. Accordingly, FIG. 4*c* shows a holohedral surface made of fiber-composite material, which is only interrupted by the recess of the tube 91. From the frontal edge 41, the profile of the fin extends in a half-circle-like manner to an area of the largest profile width, which is arranged at the height of tube 91. From there, the walls 45 run approximately parallel until they taper in a curved manner up to a trailing edge 42 after approximately more than half the length of the rudder fin.

Figure 4D:
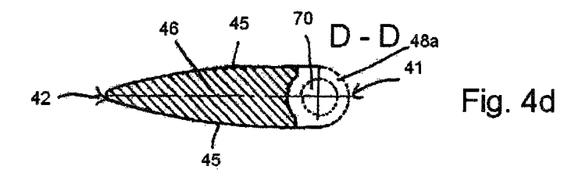

FIG. 4*d* shows a sectional view through an intermediate floor 46, which is arranged behind the recess 48*a* when seen from the longitudinal direction. It is recognizable that the intermediate floor 46 is designed integrated into the walls 45 and the trailing edge 42.

Figure 4E:
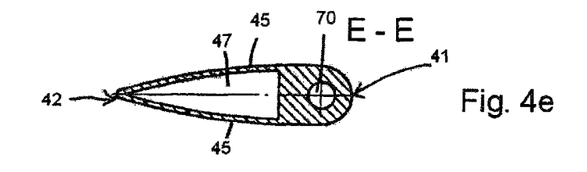

FIG. 4*e* shows another cross-sectional view, which runs through a hollow area 47. It is recognizable that the length of the front end area 41 made of fiber-composite material is approx. ⅓ of the overall length of the rudder fin. The hollow area 47 is designed approximately like a triangle, wherein the two long legs are curved.

Figure 4F:
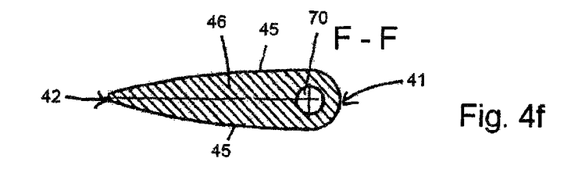
Figure 4G:
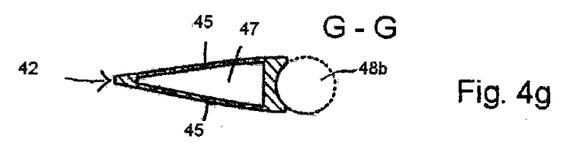

FIG. 4*f* shows another sectional view through an intermediate floor 46 and FIG. 4*g* shows a sectional view through a hollow area 47 and the recess 48*b*.

Figure 5A:
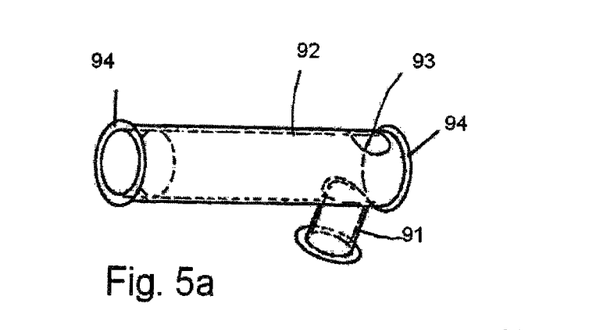
FIG. 5a a perspective representation of a receiving/joint element.
Figure 5B:
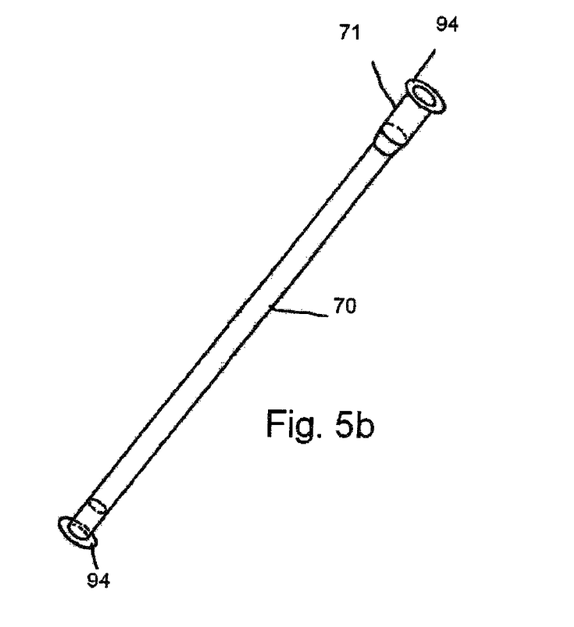
FIG. 5b a perspective representation of another receiving/joint element.
Figure 5C:
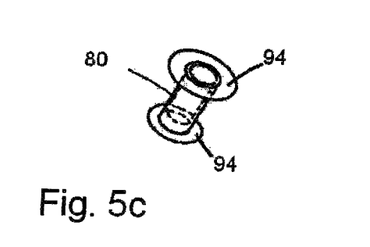
FIG. 5c a perspective representation of another receiving/joint element.

FIGS. 5*a*, 5*b* and 5*c* show perspective detail views of the tubes 70, 80, 91, 92 arranged integrated in the fin 40. The tube 70 has an upper end area 71, which is arranged in the area of the recess 48*a* and has a larger diameter with respect to the rest of tube 70. This larger diameter serves for one to reinforce the upper end area 71 and for the adjustment to the receiving of a hinge pin and a hinge of a rudder (not shown here) in the functionality of a bearing shell for the hinge pin. The tubes 91 and 92 are connected together through the formation of an almost right angle, in particular by means of welding, wherein an opening 93 is provided in tube 92 opposite tube 91. All tubes 70, 80, 91, 92 have disk-like end pieces 94 on their open ends, which come to rest on the fiber-composite material of the fin body of the fin 40. The steel tube constructions shown in FIG. 5*a* through 5*c* can also be called "inlets."

The invention claimed is:

1. A fin for a fin rudder for water vehicles, the fin comprising a fin body, wherein the fin body comprises a front leading edge facing the rudder and a trailing edge facing away from the rudder, wherein the fin body at least partially forms an outer surface of the fin, wherein the fin comprises at least one joint element for pivotable connection with the rudder, wherein the at least one joint element comprises a tube parallel to the axis of rotation of the pivotable connection, wherein the fin comprises at least one receiving element for receiving a part of an articulation device in an upper area of the fin, wherein the at least one receiving element comprises a tube, wherein the front leading edge, the trailing edge and the central axes of the tube of the at least one joint element and the tube of the at least one receiving element lie in the same plane, wherein the fin is at least partially made of fiber-composite material, wherein the tube of the at least one joint element and the tube of the at least one receiving element are both disposed inside the fin, and wherein fiber-composite material of the fin and the fin body is wound or laminated around the tube of the at least one joint element and the tube of the at least one receiving element.

2. The fin according to claim 1, wherein the fin body has one or more separated inner hollow areas filled with a foam filler material.

3. The fin according to claim 1 or 2, wherein the fin body further comprises stiffening elements arranged between the front leading edge and the rear trailing edge.

4. The fin according to claim 1, wherein the fin body is reinforced in the area of the front leading edge facing the rudder.

5. The fin according to claim 1, wherein a cross-section of the fin body in the front leading edge has a maximum length of 15%-50% of the maximum length of the fin.

6. The fin according to claim 1, wherein the at least one receiving/joint element comprises a metallic material.

7. The fin according to claim 4, wherein the fin body has one or more separated inner hollow areas filled with a foam filler material.

8. The fin according to claim 4, wherein the fin body further comprises a rear trailing edge facing away from the rudder and stiffening elements arranged between the front leading edge and the back trailing edge.

9. The fin according to claim 5, wherein the fin body has one or more separated inner hollow areas filled with a foam filler material.

10. The fin according to claim 5, wherein the fin body further comprises a rear trailing edge facing away from the rudder and stiffening elements arranged between the front leading edge and the back trailing edge.

11. The fin according to claim 6, wherein the fin body has one or more separated inner hollow areas filled with a foam filler material.

12. The fin according to claim 6, wherein the fin body further comprises a rear trailing edge facing away from the rudder and stiffening elements arranged between the front leading edge and the back trailing edge.

13. A rudder for a water vehicle, the rudder comprising a rudder blade and a fin, the fin comprising a fin body, wherein the fin body comprises a front leading edge facing the rudder blade and a trailing edge facing away from the rudder blade, wherein the fin body at least partially forms an outer surface of the fin, wherein the fin comprises at least one joint element pivotably connected to the rudder blade, wherein the at least one joint element comprises a tube parallel to the axis of rotation of the pivotal connection, wherein an upper area of the fin comprises at least one receiving element having received a part of an articulation device, wherein the at least one receiving element comprises a tube, wherein the front leading edge, the trailing edge and the central axes of the tube of the at least one joint element and the tube of the least one receiving element lie in the same plane, wherein the fin is made of fiber-composite material, wherein the tube of the at least one joint element and the tube of the at least one receiving element are both disposed inside the fin, and wherein fiber-composite material of the fin and the fin body is wound or laminated around the tube of the at least one joint element and the tube of the at least one receiving element.

14. The rudder according to claim 12, wherein a hinge on the rudder blade that is configured to pivotably connect the fin to the rudder blade is connected to or inserted into the at least one receiving/joint element of the fin.

15. The rudder according to claim 13, wherein an articulation device on the rudder blade is connected to or inserted into the at least one receiving/joint element of the fin.

16. A method for assembling a fin of a rudder for water vehicles comprising the steps of: providing a fin body comprising fiber-composite material, which at least partially forms an outer surface of the fin and has at least one hollow area, wherein the fin body comprises a front leading edge and a trailing edge; providing at least one joint element in or on the fin for pivotable connection with the rudder, wherein the a least one joint element comprises a tube parallel to the axis of rotation of the pivotable connection; providing at least one receiving element in or on the fin for receiving a part of an articulation device in an upper area of the fin, wherein the at least one receiving element comprises a tube, wherein the front leading edge, the trailing edge and the central axes of the tube of the at least one joint element and the tube of the at least one receiving element lie in the same plane, wherein the tube of the at least one joint element and the tube of the at least one receiving element are both disposed inside the fin, and wherein fiber-composite material of the fin body is wound or laminated around the tube of the at least one joint element and the tube of the at least one receiving element; connecting the one or more joint elements on the fin to the rudder; and connecting the one or more receiving elements on the fin to the articulation device.

17. The method according to claim 16, characterized in that the step of providing a fin body comprises the steps of providing two half shells of the fin body, combining the two half shells to form the fin body, and arranging stiffening elements between the two half shells.

18. The method according to claim 16, characterized in that the step of providing a fin body comprises the step of winding or laminating the fiber-composite material around at least one core, the core comprising the tube of the one or more receiving/joint elements.

19. The method according to claim 16, further comprising the step of filling the at least one hollow area with a foam filler material.

* * * * *